Figure 1:
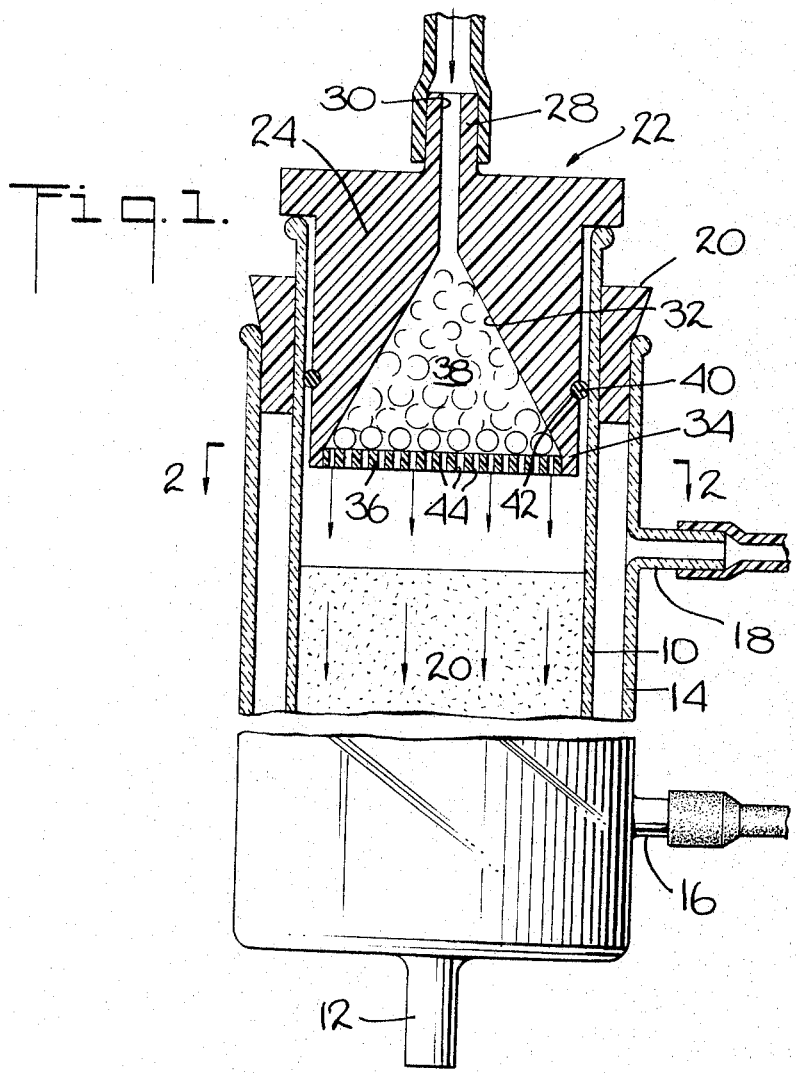

INVENTOR.
GEORGE N. CATRAVAS
BY
ATTORNEY

United States Patent Office 3,334,514
Patented Aug. 8, 1967

3,334,514
CHROMATOGRAPHIC COLUMN
George N. Catravas, Yonkers, N.Y., assignor to Technicon Corporation, a corporation of New York
Filed Dec. 16, 1964, Ser. No. 418,653
5 Claims. (Cl. 73—23.1)

This invention relates to chromatographic apparatus, and, especially, to a diffusion inlet fitting for an eluent for a preparative column.

Chromatographic columns which are used for analytical purposes are customarily of relatively small inner diameter, for example, ¼ inch. The column is filled with a suitable ion-exchange resin bed; the sample to be analyzed, such as a peptide, is applied to the top of the bed; and a buffer eluent is positively displaced into the top of the bed. The various constituent fractions of the sample are washed through the bed at different velocities, each constituent fraction being displaced as a zone of such constituent. In the small diameter of the column the planes of demarcation for each zone are relatively well resolved, and each zone may be conveniently physically separated. Such an analytical apparatus is shown in the U.S. patent application of George D. Winter and George N. Catravas, Ser. No. 358,198, filed Apr. 8, 1964, and assigned to the assignee of this application.

Chromatographic columns which are used for preparative purposes are customarily of relatively large diameter, for example, one inch to process as large a volume of material as possible. The operation of the preparative column is similar to that of the analytical columns, except that the planes of demarcation for each zone are not so well defined, with the result that two closely adjacent zones may blend into each other.

It is an object of this invention to provide a chromatographic column of relatively large diameter which will provide as well resolved planes of zonal demarcation as a similar column of relatively small diameter.

I have discovered that the cause of this poor resolution of the planes of zonal demarcation in the customary columns of large diameter is that the eluent is initially applied to only a small central cross-sectional area of the resin bed at a relatively high velocity. This is a result of the inlet fitting being of relatively small diameter, and the resin bed being of relatively large diameter. This in turn results in a laminar flow of the eluent longitudinally through the bed, that is, a non-uniform velocity of the eluent measured transversely through the bed, which results in the poor resolution of the zonal demarcation planes.

It is, therefore, an object of this invention to provide an inlet fitting for the eluent which will apply the eluent across the entire cross-section of the resin bed at a relatively uniform and slow velocity.

A feature of this invention is the provision of an inlet fitting comprising an inlet of small cross-sectional area for coupling to the source of eluent, means for distributing the eluent uniformly over a larger cross-sectional area at a relatively lower and uniform velocity, and an outlet for applying the eluent to the resin bed.

Figure 2:
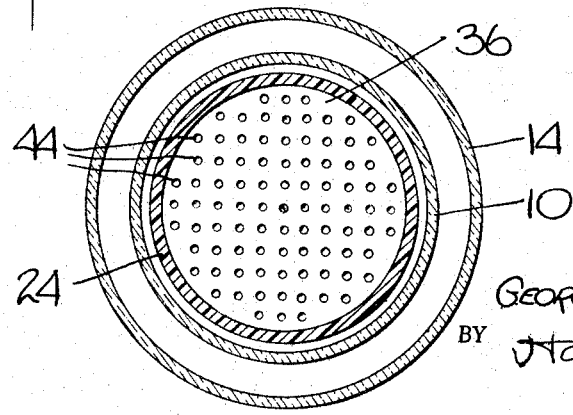

These and other objects, features and advantages will become apparent on consideration of the following specification taken in conjunction with the drawings in which:

FIGURE 1 is an elevation, partially in cross-section, of a fitting and the associated chromatographic column embodying this invention; and FIGURE 2 is transverse cross-section taken through plane 2—2 of FIGURE 1.

The chromatographic column comprises an inner tube 10 having an outlet 12, and an outer heating bath tube 14 having an inlet 16 and an outlet 18. The inner tube 10 is spaced from and sealed to the outer tube 14 by an upper gasket 20 and a lower gasket, not shown. The inner tube 10 is filled to a short distance from its top with a suitable ion-exchange resin, customarily in the form of beads, to form the resin bed 20.

An inlet fitting 22 is sealed into the top of the inner tube 10 and spaced slightly from the top of the resin bed. This fitting comprises a body 24 having an annular shoulder, an inlet portion 28, an inlet bore 30 which is developed into a cone shaped cavity 32, and an annular flange portion 34. The cavity is filled with spheres or substantially rounded elements 38 of very small diameter. The fitting is sealed within the inner tube 10 by an O-ring 40 which is mounted into a peripheral groove 42 in the body 24. The perforations 44 may be arranged in any suitable pattern, here shown as rectangular grid, which will provide an equal number of holes for equal areas of transverse cross-section of the tube 10, which for practical construction purposes is the area of the disc 36. The perforations are made of relatively small diameter to preclude the tendency of a large fraction of the eluent from traveling the shortest path through the cavity to the perforations in the center of the disc and passing out therethrough. I have made the body out of "Kel-F," and the perforate disc of "Teflon," both fluorinated hydrocarbons having a non-wetting characteristic. The spheres 38 are glass beads of 2 mm. diameter and the perforations 44 in the disc are of .0025 inch diameter.

The eluent enters the bore 30 at relatively high velocity, but is distributed and reduced in velocity by the interstices provided by the spheres 38 over the area of the disc 36 and passes out through the perforations 44 at a low and uniform velocity. The stream of eluent applied to the top of the resin bed is therefore transversely uniform in velocity, and the eluent thus uniformly strips the fractions from the bed and longitudinally advances these fractions with well resolved transverse planes of demarcation down the resin bed.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What I claim is:
1. An eluent inlet for a chromatographic column having a tube with an open end, comprising: an inlet assembly for disposition within and for closing the open end of the tube including a body means having an inlet bore with a relatively large diameter in fluid flow communication with the outside of the tube, a plurality of outlet bores each with a relatively small diameter in fluid flow communication with the inside of the tube, and a relatively large plurality of passageways of relatively very small diameter coupling said inlet bore with said plurality of outlet bores.

2. An eluent inlet for a chromatographic column having a tube with an open end, comprising: an inlet assembly for disposition within and for closing the open end of the tube including a body means having an inlet bore with a relatively large diameter in fluid flow communication with the outside of the tube, a plurality of outlet bores each with a relatively small diameter in fluid flow communication with the inside of the tube, and a relatively large plurality of passageways of relatively very small diameter coupling said inlet bore with said plurality of outlet bores, said outlet bores being transversely so spaced apart as to uniformly distribute an eluent, entering through said inlet bore, over the transverse cross-sectional area of the interior of the tube.

3. An eluent inlet for a chromatographic column having a tube with an open end, comprising: an inlet assembly for disposition within and for closing the open end of the tube including a body means having a cavity therein, an inlet bore therein in fluid flow communication between the outside of the tube and said cavity, a plurality of outlet bores therein in fluid flow communication between said cavity and the inside of the tube, and a plurality of spheroidal elements closely packed within said cavity.

4. An eluent inlet for a chromatographic column having a tube with an open end, comprising: an inlet assembly for disposition within and for closing the open end of the tube including a body means having a cavity therein, an inlet bore therein in fluid flow communication between the outside of the tube and said cavity, a plurality of outlet bores therein in fluid flow communication between said cavity and the inside of the tube, and a plurality of spheroidal elements closely packed within said cavity, said outlet bores being transversely so spaced apart as to uniformly distribute an eluent, entering through said inlet bore, over the transverse cross-sectional area of the interior of the tube.

5. An eluent inlet for a chromatographic column having a tube with an open end, comprising: an inlet assembly for disposition within and for closing the open end of the tube including a body having a main portion for disposition within the tube, a transversely extending shoulder portion for abutting the end of the tube for precluding the entry of the entire inlet assembly into the tube, a longitudinally extending inlet bore, a cone shaped central cavity having its apex merging into said inlet bore, and a longitudinally extending flange formed about the base of said cavity; a disc sealed within said flange to close said base of said cavity, said disc having a plurality of longitudinally extending perforations therethrough, said perforations being spaced apart to provide an equal number of perforations for each equal area of said disc; and a plurality of closely packed, rigid, globules disposed in said cavity.

References Cited
UNITED STATES PATENTS 2,826,908    3/1958    Skarstrom.
3,077,103    2/1963    Heaton.

JAMES J. GILL, *Primary Examiner.*

CHARLES A. RUEHL, *Assistant Examiner.*